United States Patent [19]

Madurski

[11] Patent Number: 4,599,988
[45] Date of Patent: Jul. 15, 1986

[54] PORTABLE BARBECUE

[76] Inventor: Walter Madurski, 17151 Gitre, Detroit, Mich. 48205

[21] Appl. No.: 765,771

[22] Filed: Aug. 15, 1985

[51] Int. Cl.⁴ .............................................. F24C 1/16
[52] U.S. Cl. ................................. 126/9 R; 126/25 R; 248/168; 248/439
[58] Field of Search ................. 126/9 R, 25 R, 25 A, 126/9 B, 38, 37 R; 248/439, 170, 168, 188.6

[56] References Cited

U.S. PATENT DOCUMENTS

| | | | |
|---|---|---|---|
| 1,094,151 | 4/1914 | Kemp | 126/9 R |
| 1,518,713 | 12/1924 | Trom | 126/38 |
| 1,520,589 | 12/1924 | Matkovic | 248/439 |
| 1,544,651 | 7/1925 | Klinert | 126/38 |
| 1,709,927 | 4/1929 | Whitney | 248/439 X |
| 2,222,070 | 11/1940 | Graves | 248/168 |
| 2,556,365 | 6/1951 | McKnight, Jr. | 126/38 X |
| 3,254,590 | 6/1966 | Watts | 126/25 R X |
| 3,809,051 | 5/1974 | Giroux | 126/25 R X |
| 4,131,261 | 12/1978 | Shy | 248/439 |

*Primary Examiner*—Larry Jones
*Attorney, Agent, or Firm*—Cullen, Sloman, Cantor, Grauer, Scott & Rutherford

[57] ABSTRACT

A portable barbecue includes a firebox having bottom, side and end walls with a grill removably mounted upon the firebox. A pair of U-shaped legs are pivotally mounted upon the bottom wall and extend angularly outward. Spring detents upon the bottom wall retainingly engage and interlock with said legs when fully open. The legs are adapted to pivotally fold into engagement with the bottom wall.

5 Claims, 6 Drawing Figures

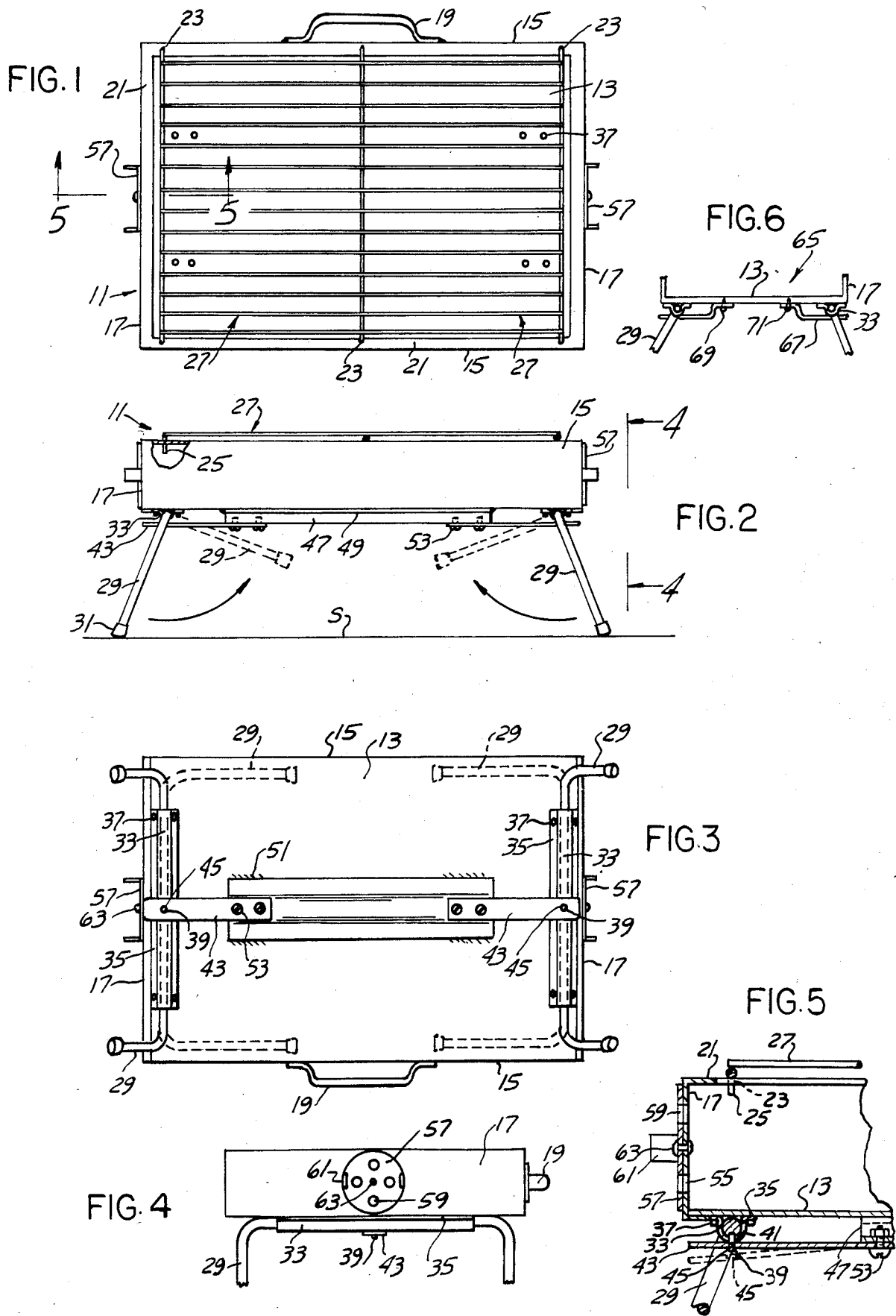

PORTABLE BARBECUE

The present invention relates to a portable barbecue having a firebox with a grill with a pair of U-shaped legs pivotally mounted upon its bottom wall extending downwardly and outwardly and with a detent for locking the legs in fully open position.

BACKGROUND OF THE INVENTION

Heretofore barbecue assemblies have been constructed with an overlying grill covering the firebox wherein the legs depend from the firebox for mounting upon a support or ground surface. One difficulty in conventional barbecue constructions has been storing when not in use. In most cases the legs are not known to separate from the firebox or be collapsible thereunder. Heretofore, due to a lack of a compact construction moving the barbecue from place to place has been difficult and inconvenient.

SUMMARY OF THE INVENTION

An important feature of the present invention is to provide an improved portable barbecue including a firebox having an overlying removable grill and wherein the supporting legs are collapsible into parallel engagement with the bottom wall and wherein a handle upon one side wall permits easy carrying of the barbecue when not in use or to move to a storage area.

Another feature is to provide a portable barbecue having a firebox including bottom, side and end walls with a grill removably overlying the firebox and employing a pair of spaced inverted U-shaped legs which supportably engage and are pivotally mounted upon the underside of the firebox at its opposite ends and extend angularly downward and outward therefrom.

Another feature includes a spring detent means upon the bottom wall adapted to retainingly engage and interlock with the legs when fully open to prevent accidental collapse thereof and wherein the legs are adapted to pivotally fold into snug engagement with the bottom wall of the firebox parallel thereto when not in use.

Another feature includes the provision of a spring detent assembly upon the legs such that on fully opening movement thereof, the legs will snap into a locked position to provide a sturdy non-yielding support for the barbecue assembly.

An important feature is to provide an improved pivot mounting for the bight of the pair of U-shaped legs by which the legs are pivotally supported upon and frictionally against the undersurface of the firebox bottom wall so as to remain against the firebox when folded to non-use position.

Another feature includes vents through the end walls of the firebox with overlying apertured vent control discs journaled upon the end walls covering said vents so that in certain positions of rotated adjustment progressively open up the vents.

These and other features and objects will be seen from the following Specification and claims in conjunction with the appended drawing.

THE DRAWING

FIG. 1 is a plan view of the present portable barbecue.

FIG. 2 is a side elevational view thereof.

FIG. 3 is a bottom plan view thereof.

FIG. 4 is an end view taken in the direction of arrows 4—4 of FIG. 2.

FIG. 5 is a fragmentary vertical section taken in the direction of arrows 5—5 of FIG. 1, on an increased scale.

FIG. 6 is a fragmentary view similar to FIG. 2, showing a modified spring detent assembly.

It will be understood that the above drawing illustrates merely a preferred embodiment of the invention and that other embodiments are contemplated within the scope of the claims hereafter set forth.

BRIEF DESCRIPTION OF AN EMBODIMENT OF THE INVENTION

The portable barbecue 1 has firebox which includes bottom wall 13, spaced side walls 15 and end walls 17, and upon one side wall the elongated handle 19.

The respective side and end walls terminate in the inwardly directed top peripheral flange 21 over which the grill 27 is removably positioned overlying the firebox.

A plurality of longitudinally spaced pairs of apertures 23 are formed through flange 21 adjacent the side walls 15 and are adapted to receive the corresponding pairs of supports 25 which depend from the grill 27. Said supports are adapted for nesting, location and support within the corresponding apertures 23 in peripheral flange 21.

The relationship of the respective apertures 23 and corresponding support rods 25 which form a part of the grill is such that there will be a limited frictional assembly of at least one of the supports 25 with respect to a corresponding aperture 23. This tends to frictionally retain the grill as assembled over flange 21 during use and when the barbecue is carried in an upright position.

Due to the symmetrical arrangement of the corresponding supports 25 or posts and the apertures 23 the grill may be reversed end to end and easily assembled, FIGS. 1 and 2.

Upon the underside of bottom wall 13 of the firebox, there is provided a pair of longitudinally spaced inverted U-shaped legs 29 which terminate in rubber feet 31 for supporting engagement with a suitable support S which may be a table or the ground or other flat area.

Each of the U-shape legs is pivotally supported upon the underside of bottom wall 13 by corresponding transverse support channels 33. These are adapted to frictionally engage the bights of each leg 29. Each of the leg support channels includes the laterally directed mount flanges 35 which bear against bottom wall 13 and are suitably secured thereto as by fasteners 37 or by welding.

When barbecue 11 is not in use, it can be stored or carried, with the legs folded so as to engage bottom wall 13 of the firebox as shown in dash lines, FIG. 3. Here the legs are retained in such closed or collapsed position by frictional engagement with leg support channels 33.

Suitable spring detent means are mounted upon bottom wall 13 adjacent the respective legs and are adapted for securing the legs when pivoted to a fully open positon, FIGS. 2, 3, 4 and 5.

In the illustrative embodiment the spring detent means includes detent pin 39, which depends from the bight portion of the legs 29 and extends through an arcuate slot 41, FIG. 5, within leg support channel 33 and is adapted for cooperative registry with lock aperture 45 adjacent one end of leaf spring 43.

In the illustrative embodiment, spring mount channel 47 underlies bottom wall 13 longitudinally thereof and intermediate side walls 15. Said channel includes a pair of laterally directed mount flanges 49 which are suitably secured to the bottom wall as by welds at 51. Channel 47, 49 serves to reinforce said bottom wall.

The spring detent means includes a pair of spaced aligned leaf springs 43 which at their one ends overlie and are secured to spring mount channel 47, FIG. 3 by fasteners 53.

Each of the leaf springs 43 adjacent its outer end has a transverse lock aperture 45, FIG. 5, adapted to receive the corresponding detent pin 39 when the corresponding leg 39 has been rotated to its outermost normal use position.

From the practically closed folded position of the legs shown in dash lines 29, as the legs are individually rotated downwardly and outwardly with respect to bottom wall 13, detent pin 39 normally is biased against the corresponding leaf spring 43. As the leg is finally opened to its use position the detent pin is in registry with the corresponding lock aperture 45, and the leaf spring resiliently snaps into locking registry therewith. This provides an efficient means for securing the legs 29 in fully open position, FIGS. 2 and 3.

In order to release the legs, it is necessary to manually flex the free ends of the corresponding leaf springs downwardly sufficient so as to disengage from the corresponding detent pin 39 on the respective leg. Thereafter, the legs may be manually rotated to the folded position shown in dash lines 3. The legs are self-retaining in such position due to th frictional engagement of the corresponding leg support channel 33 with the central bight portion of the legs.

Each of the end walls 17 have a plurality of spaced vents 55 therethrough. Vent control disc 57 having a plurality of apertures 59 therein and a handle 61 is pivotally mounted as by the rivet 63 so as to overlie the vents 55 for closing the same. On manual rotation the discs progressively open said vents for proper ventilation of the firebox.

MODIFICATION

A modified leg mount assembly is shown at 65, FIG. 6, wherein the pivot mounting for the legs 29 is the same including the corresponding detent pins 39. In this case the leaf spring support channel 47-49 of FIG. 3 is omitted. The corresponding leaf springs 67 having laterally displaced mount flanges 69 secured to bottom wall 13 by fasteners 71. In operation the anchoring is the same, since upon proper angular opening movement of the legs 29, the corresponding detent pin 39 will rotate so as to be received within the corresponding lock aperture 45 the same as shown in FIG. 5.

Having described my invention, reference should now be had to the following claims

I claim:

1. A portable barbecue comprising a firebox having bottom, side and end walls;
   a grill overlying and removably mounted upon said firebox;
   a pair of longitudinally spaced inverted U-shaped legs supportably engaging and pivotally mounted upon the underside of said bottom wall adjacent its opposite ends and extending downwardly and angularly outward for engagement with a support;
   and spring detent means upon said bottom wall retainingly engaging and interlocked with said legs when fully open, said legs adapted to pivotally fold into snug engagement with said bottom wall parallel thereto when not in use;
   said spring detent means including a leaf spring at one end secured to said bottom wall and adjacent its other end having a lock aperture;
   and a detent pin depending from said leg and upon fully open movement of said leg adapted for interlocking registry with said leaf spring lock aperture.

2. In the portable barbecue of claim 1, said leaf spring being deflected under tension by said detent pin on opening of said leg and said spring resiliently snapping over said pin when its lock aperture is in registry therewitn.

3. A portable barbecue comprising a firebox having bottom, side and end walls;
   a grill overlying and removably mounted upon said firebox;
   a pair of longitudinally spaced inverted U-shaped legs supportably engaging and pivotally mounted upon the underside of said bottom wall adjacent its opposite ends and extending downwardly and angularly outward for engagement with a support;
   and spring detent means upon said bottom wall retainingly engaging and interlocked with said legs when fully open, said legs adapted to pivotally fold into snug engagement with said bottom wall parallel thereto when not in use;
   the pivotal mounting of said legs including for each leg an elongated U-shaped channel frictionally retaining the bight of each U-shaped leg;
   and opposed outturned mount flanges along said channel bearing against and secured to said bottom wall;
   said channels frictionally retaining said legs when folded;
   said spring detent means including a leaf spring at one end secured to said bottom wall and adjacent the other end having a lock aperture;
   and a detent pin depending from said bight and through an arcuate slot in said channel, upon fully opening movement of said leg adapted for interlocking registry with said leaf spring lock aperture.

4. A portable barbecue comprising a firebox having bottom, side and end walls;
   a grill overlying and removably mounted upon said firebox;
   a pair of longitudinally spaced inverted U-shaped legs supportably engaging and pivotally mounted upon the underside of said bottom wall adjacent its opposite ends and extending downwardly and angularly outward for engagement with a support;
   and spring detent means upon said bottom wall retainingly engaging and interlocked with said legs when fully open, said legs adapted to pivotally fold into snug engagement with said bottom wall parallel thereto when not in use;
   said spring detent means including a spring mount channel upon the underside of said bottom wall including a pair of opposed mount flanges secured thereto;
   and a pair of aligned leaf springs at their one ends mounted upon said spring mount channel and secured thereto;
   and at their other ends having a lock aperture;
   and a detent pin depending from the bight of each leg and upon fully opening movement of said legs adapted for interlocking registry with said leaf spring lock apertures, respectively.

5. A portable barbecue comprising a firebox having bottom, side and end walls;

a grill overlying and removably mounted upon said firebox;

a pair of longitudinally spaced inverted U-shaped legs supportably engaging and pivotally mounted upon the underside of said bottom wall adjacent its opposite ends and extending downwardly and angularly outward for engagement with a support;

and spring detent means upon said bottom wall retainingly engaging and interlocked with said legs when fully open, said legs adapted to pivotally fold into snug engagement with said bottom wall parallel thereto when not in use;

the pivotal mounting of said legs including for each leg an elongated U-shaped channel frictionally retaining the bight of each U-shaped leg;

and opposed outturned mount flanges along said channel bearing against and secured to said bottom wall;

said channels frictionally retaining said legs when folded;

said spring detent means including a spring mount channel upon the underside of said bottom wall and secured thereto;

a pair of aligned leaf springs at their one ends mounted upon said spring mount channel and secured thereto;

and at their other ends having a lock aperture;

and a detent pin depending from the bight of each leg, through an arcuate slot in said leg mount channel and upon fully opening movement of said legs adapted for interlocking registry with said leg leaf spring lock apertures respectively.

* * * * *